United States Patent
Lee et al.

(10) Patent No.: US 7,097,309 B2
(45) Date of Patent: Aug. 29, 2006

(54) LIGHTING SYSTEM AND COMPACT PROJECTION SYSTEM

(75) Inventors: Young-chol Lee, Suwon-si (KR); Il Kweon Moon, Suwon-si (KR); Hee-joong Lee, Anyang-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 31 days.

(21) Appl. No.: 10/700,054

(22) Filed: Nov. 4, 2003

(65) Prior Publication Data

US 2004/0169822 A1 Sep. 2, 2004

(30) Foreign Application Priority Data

Nov. 5, 2002 (KR) .................. 10-2002-0068085

(51) Int. Cl.
| | |
|---|---|
| G03B 21/28 | (2006.01) |
| G03B 21/26 | (2006.01) |
| G02F 1/00 | (2006.01) |
| H04N 5/74 | (2006.01) |
| G02B 27/10 | (2006.01) |
| F21V 5/00 | (2006.01) |
| F21V 7/00 | (2006.01) |

(52) U.S. Cl. .................. 353/99; 353/20; 353/37; 353/38; 353/84; 348/771; 359/619; 362/328; 362/346

(58) Field of Classification Search .......... 353/99, 353/20, 37–38, 84, 98; 348/771; 359/20, 359/621, 619; 362/328, 346
See application file for complete search history.

(56) References Cited

U.S. PATENT DOCUMENTS

| | | | | |
|---|---|---|---|---|
| 4,755,916 | A | * | 7/1988 | Collins .................. 362/236 |
| 5,128,848 | A | * | 7/1992 | Enders et al. .............. 362/268 |
| 6,457,830 | B1 | * | 10/2002 | Choi ...................... 353/33 |
| 6,577,429 | B1 | * | 6/2003 | Kurtz et al. .............. 359/279 |
| 6,594,090 | B1 | * | 7/2003 | Kruschwitz et al. ........ 359/707 |
| 6,839,095 | B1 | * | 1/2005 | Bierhuizen et al. .......... 349/9 |
| 6,953,271 | B1 | * | 10/2005 | Aynie et al. .............. 362/511 |
| 2004/0032739 | A1 | * | 2/2004 | Johanson .................. 362/304 |
| 2005/0007557 | A1 | * | 1/2005 | Huibers .................... 353/31 |

FOREIGN PATENT DOCUMENTS

JP 2-98272 4/1990

* cited by examiner

Primary Examiner—W. B. Perkey
Assistant Examiner—Magda Cruz
(74) Attorney, Agent, or Firm—Staas & Halsey LLP

(57) ABSTRACT

A projection system including a lighting system, a screen, a color filter separating light emitted from the lighting system according to wavelengths of the light, a first reflecting mirror reflecting the light passing through the color filter to change a path of the light, a display device provided in a predetermined position in the first reflecting mirror, a second reflecting mirror reflecting light reflected from the first reflecting mirror toward the display device, and a projection lens unit enlarging and projecting a color image formed by the display device onto the screen.

19 Claims, 5 Drawing Sheets

LIGHTING SYSTEM AND COMPACT PROJECTION SYSTEM

CROSS-REFERENCE TO RELATED APPLICATIONS

This application claims the priority of Korean Patent Application No. 2002-68085, filed on Nov. 5, 2002, in the Korean Intellectual Property Office, the disclosure of which is incorporated herein in its entirety by reference.

BACKGROUND OF THE INVENTION

1. Field of the Invention

The present invention relates to a lighting system and a projection system which have an improved structure, so that the lighting system and the projection system can be made small and thin.

2. Description of the Related Art

Techniques for making projection systems small and thin have been researched and developed. In the conventional art, techniques for making a projection system small include using a mirror method and a total reflection prism. In particular, a technique using the mirror method is applied to make a projection system small and lightweight.

Figure 1:
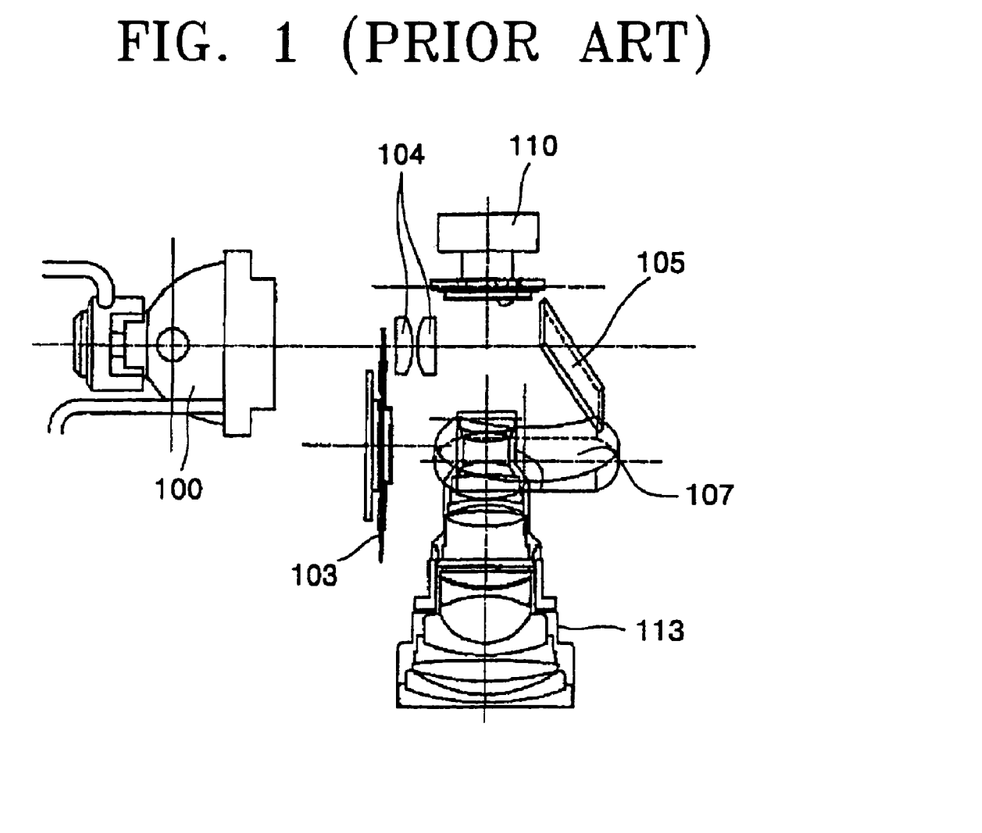
FIG. 1 is a plan view of an image displaying apparatus disclosed in Japanese Patent Publication No. 2000-98272.
Figure 2:
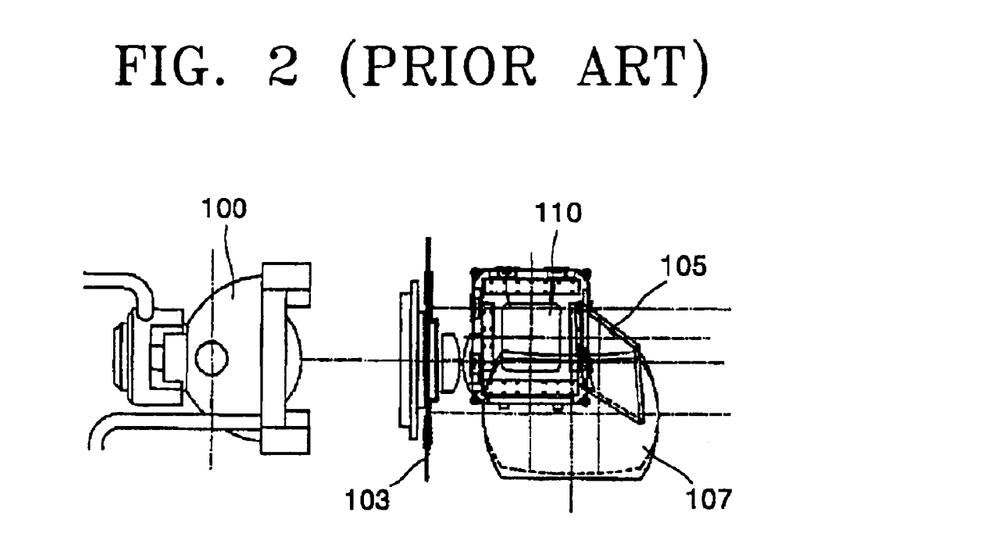
FIG. 2 is a front view of the image displaying apparatus shown in FIG. 1.

An image displaying apparatus using the mirror method is disclosed in Japanese Patent Publication No. 2000-98272. Here, as shown in FIGS. 1 and 2, in the image displaying apparatus, light emitted from a light source 100 is split into R, G, and B color beams by a color wheel filter 103. The R, G, and B color beams are sequentially reflected on a first reflecting mirror 105. Next, the R, G, and B color beams are reflected on a second reflecting mirror 107, and then focused onto a deformable mirror device (DMD) 110. A condenser lens 104 is further included in an optical path between the color wheel filter 103 and the first reflecting mirror 105.

The DMD 110 has a plurality of micromirrors (not shown), which are two-dimensionally arranged and turned on and off according to an image signal input to each pixel. When the micromirrors are turned on, light reflected on the micromirrors is incident on a projection lens unit 113. When the micromirrors are turned off, light reflected on the micromirros travel in a direction deviating from the projection lens unit 113. Thus, R, G, and B color beams are incident or not incident on pixels each corresponding to the R, G, and B color beams to form a color image.

With reference to FIG. 1, light emitted from the light source 100 passes through the first reflecting mirror 105 and the second reflecting mirror 107 to the DMD 110. In the above-described structure, the first reflecting mirror 105, the second reflecting mirror 107, and the DMD 110 are arranged in a triangle shape. The projection lens unit 113 is installed aside the second reflecting mirror 107. However, the projection lens unit 113 is arranged in a proper position so that light reflected from the DMD 110 is incident on the projection lens unit 113. In a conventional optical path, the first reflecting mirror 105, the second reflecting mirror 107, and the DMD 110 are arranged in different directions and different positions, respectively. Thus, an image displaying apparatus cannot be made small.

Light reflected from the first reflecting mirror 105 is incident on the second reflecting mirror 107, which is disposed in a different position from the first reflecting mirror 105. Light reflected from the second reflecting mirror 107 is incident on the DMD 110 opposite to the second reflecting mirror 107. Thus, the optical path is complicated. Therefore, when a DMD installed in a narrow space is turned on/off, it is difficult to split a beam according to a method of driving pixels processing image data in the DMD. Also, when the DMD is turned off, light may be incident on the projection lens unit 113. Moreover, since the second reflecting mirror 107 and the projection lens unit 113 are arranged in the same direction, an installation space is considerably limited.

SUMMARY OF THE INVENTION

Accordingly, the present invention provides a projection system using a small optical system, achieved by simplifying an optical path of a reflecting mirror, and a lighting system which has an improved structure so that the lighting system is suitable for being used in the projection system.

Additional aspects and/or advantages of the invention will be set forth in part in the description which follows and, in part, will be obvious from the description, or may be learned by practice of the invention.

According to an aspect of the present invention, there is provided a projection system including a lighting system, a screen, a color filter separating light emitted from the lighting system according to wavelengths of the light, a first reflecting mirror reflecting the light passing through the color filter to change a path of the light, a display device provided in a predetermined position in the first reflecting mirror, a second reflecting mirror reflecting light reflected from the first reflecting mirror toward the display device, and a projection lens unit enlarging and projecting a color image formed by the display device onto the screen.

The lighting system may include a lamp light source radiating the light, a reflector reflecting the light emitted from the lamp light source to emit the light in one direction, and an intercepting unit reflecting a portion of the light emitted from the lamp light source toward the reflector so that the light emitted from the reflector has an annular light distribution.

The intercepting unit may be convex, the surface thereof curving toward the lamp light source.

Uniform light forming units may be provided in an optical path between the lighting system and the first reflecting mirror, wherein the uniform light forming units convert the light passing through the color filter into uniform light. Shielding plates may be provided in the centers of the uniform light forming units, shielding incident light from proceeding.

The first reflecting mirror and the second reflecting mirror may be symmetrical with respect to an optical axis.

According to another aspect of the present invention, there is also provided a lighting system including a lamp light source radiating light, a reflector reflecting the light emitted from the lamp light source to emit the light in one direction, and an intercepting unit reflecting a portion of the light emitted from the lamp light source toward the reflector so that the light emitted from the reflector has an annular light distribution.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
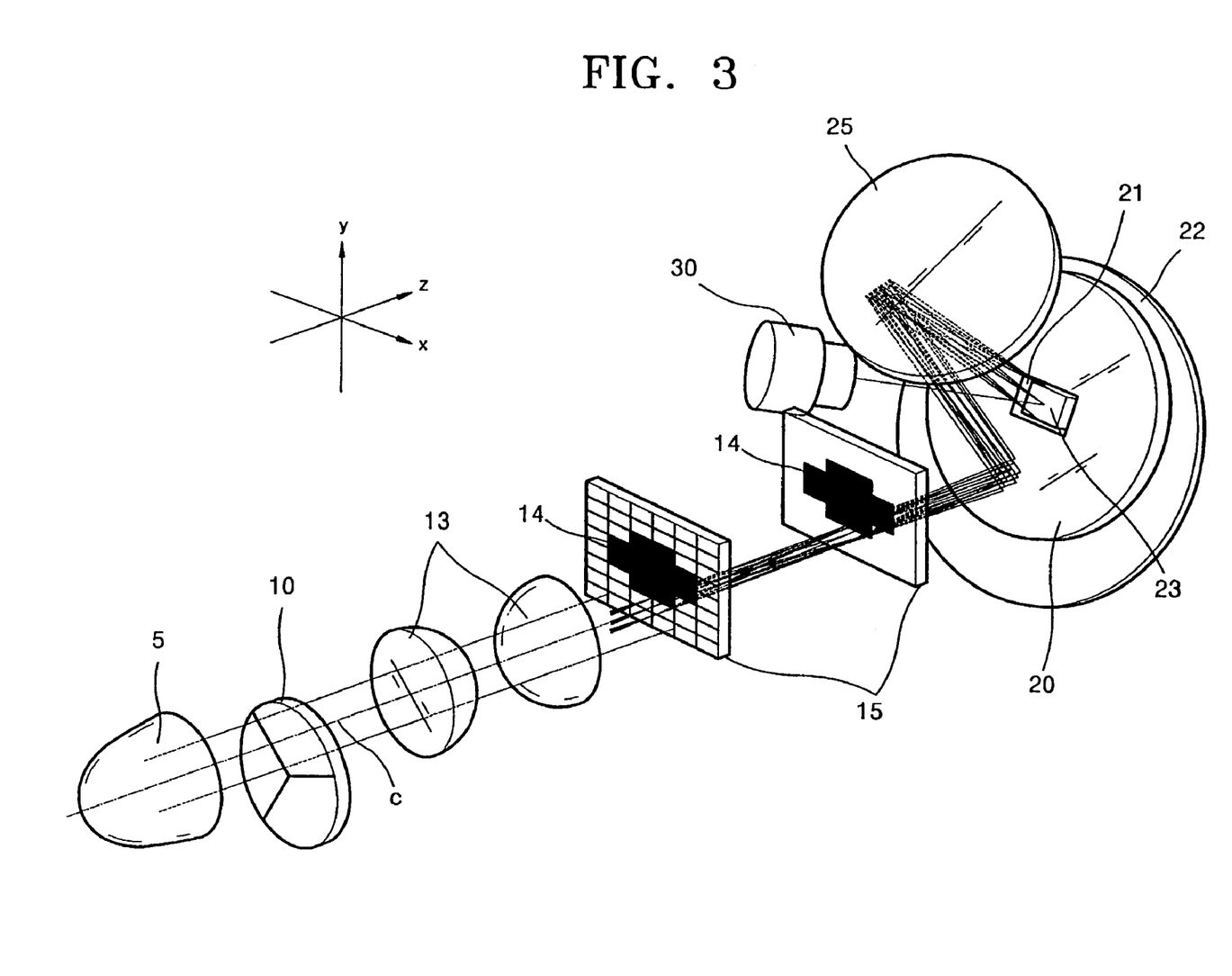
FIG. 3 is an exploded perspective view of a small-sized projection system according to the present invention.

Referring to FIG. 3, a projection system according to the present invention includes a light system 5, a first reflecting mirror 20 on which light emitted from the lighting system 5 is reflected, a display device 23 which is installed in the surface of the first reflecting mirror 20, and a second reflecting mirror 25 which reflects light reflected from the first reflecting mirror 20 onto the display device 23.

A color filter 10, collimating lenses 13, and uniform light forming units 15 are disposed in an optical path between the lighting system 5 and the first reflecting mirror 20. The color filter 10 sequentially splits light emitted from the lighting system 5 into R, G, and B color beams. The collimating lenses 13 converts light passing through the color filter 10 into parallel light. The uniform light forming units 15 forms incident light into uniform light.

In the present invention, the display device 23 is installed in the surface of the first reflecting mirror 20. The second reflecting mirror 25 receives light reflected from the first reflecting mirror 20 and reflects the received light toward the display device 23.

Figure 4:
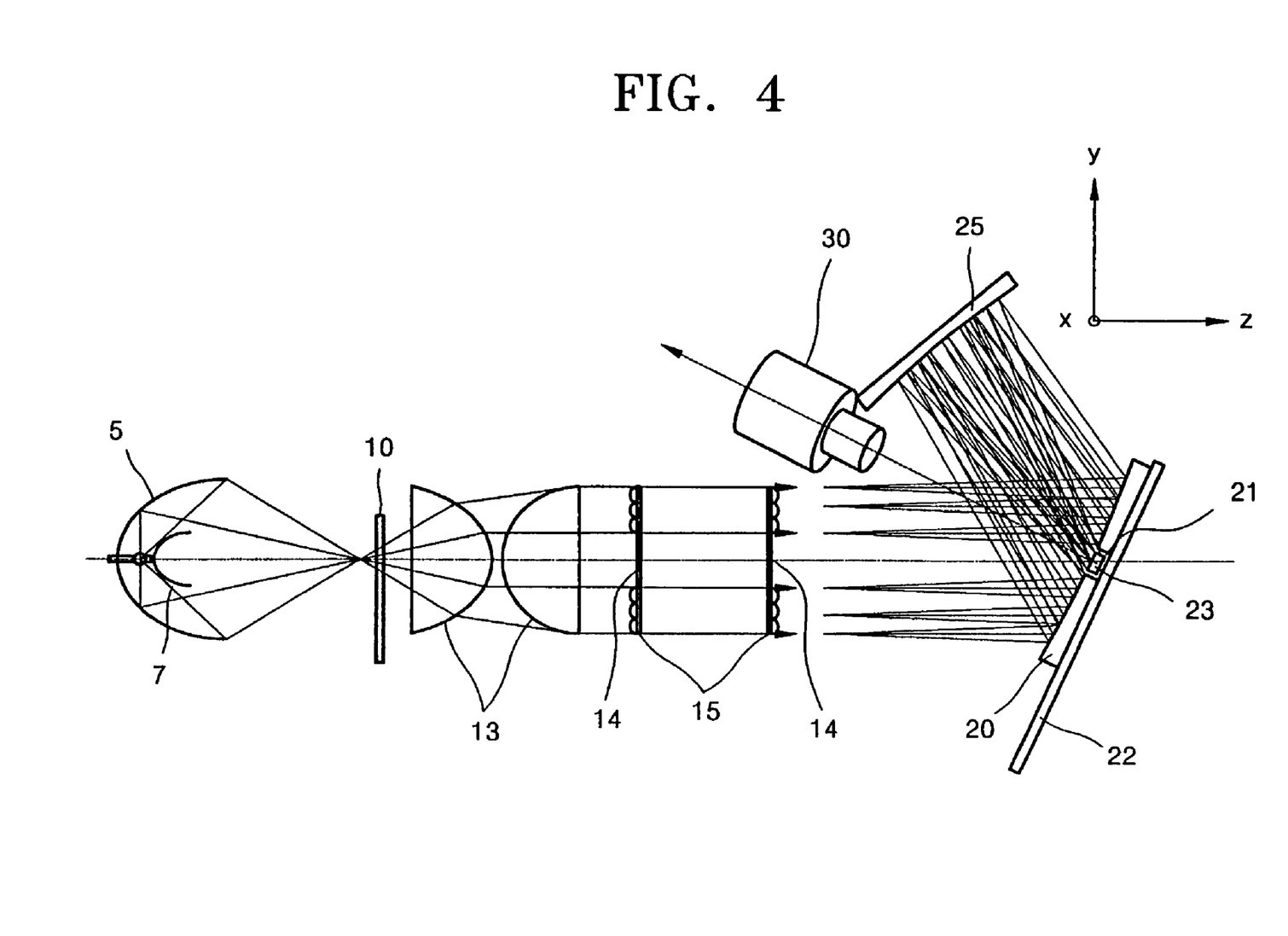
FIG. 4 is a front view of the small-sized projection system shown in FIG. 3.

FIG. 4 shows the arrangement structure and an optical path of the first reflecting mirror 20, the display device 23, and the second reflecting mirror 25. Here, since the display device 23 is installed inside the first reflecting mirror 20, only spaces for installing the first and second reflecting mirrors 20 and 25 are necessary. It is easily seen from FIG. 4 that the arrangement structure of the first reflecting mirror 20, the second reflecting mirror 25, and the display device 23 is different from the triangle arrangement of the first reflecting mirror 105, the second reflecting mirror 107, and the DMD 110 according to the conventional art (see FIG. 1). Thus, the arrangement structure according to the present invention contributes to a remarkable reduction in a space for installing the optical components, compared with the arrangement structure according to the conventional art.

The first reflecting mirror 20 is inclined at a predetermined angle with an optical axis of light made uniformly incident by the uniform light forming units 15. The second reflecting mirror 25 is arranged so that light reflected from the first reflecting mirror 20 is reflected on the second reflecting mirror 25 and focused onto the display device 23.

The first and second reflecting mirrors 20 and 25 may be elliptic mirrors, plane mirrors, spherical mirrors, or aspherical mirrors. The first and second reflecting mirrors 20 and 25 may be symmetrical or asymmetrical, depending on the positions thereof.

The display device 23 may be inserted into a hole 21 formed in the first reflecting mirror 20. A drive 22 driving the display device 23 may be disposed on the back surface of the first reflecting mirror 20. The display device 23, for example, may be a moveable mirror device, which realizes a color image due to the on-off switching operation of a micromirror, or a liquid crystal display device, which realizes a color image by modulating incident light to polarized light.

When light emitted from the lighting system 5 is incident on the first reflecting mirror 20, the light must not be incident on the display device 23. Since the intensity of light emitted from the light system 5 is non-uniform, image quality may be deteriorated when light is directly incident on the display device 23. To prevent this, a unit which intercepts light emitted from the lighting system 5 from being incident on the display device 23, is required. Here, light emitted from the lighting system 5 is uniformly formed by the uniform light forming units 15. However, since this cannot provide sufficient image quality, light is made further uniform via the first and second reflecting mirrors 20 and 25, and then incident on the display device 23.

A method of modifying the structure of the lighting system 5 so that light is not emitted from the center of the lighting system 5 will be described.

Figure 5A:
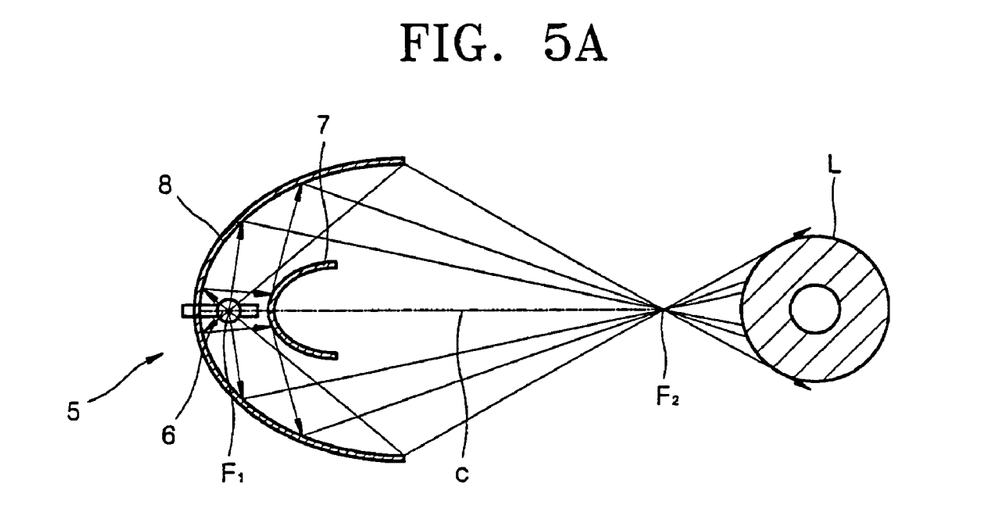
FIG. 5A is a view of a lighting system according to an embodiment of the present invention.

As shown in FIG. 5A, the lighting system 5 includes an intercepting unit 7 intercepting light emitted from the center of the lighting system 5. The lighting system 5 includes a lamp light source 6, a reflector (not shown) which reflects light emitted from the lamp light source 6 in a predetermined direction, and the intercepting unit 7, which intercepts a portion of light emitted from the lamp light source 6.

Figure 5B:
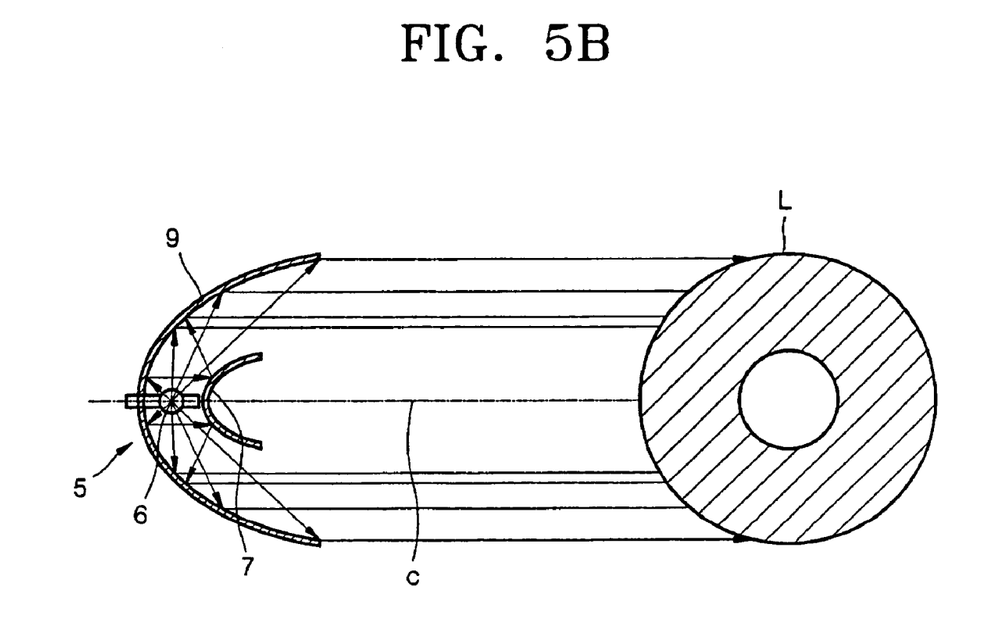
FIG. 5B is a view of a lighting system according to another embodiment of the present invention.

The reflector, for example, may be an elliptic mirror 8 shown in FIG. 5A, or a parabolic mirror 9 shown in FIG. 5B. In FIG. 5A, the lighting system 5 includes the lamp light source 6, the intercepting unit 7, and the elliptic mirror 8. A portion of light in a radial shape emitted from the lamp light source 6 is reflected on the elliptic mirror 8 and emitted via an opening of the elliptic mirror 8. Light reflected from the intercepting unit 7 is further reflected on the elliptic mirror 8 and emitted. Here, since a middle portion of light emitted from the lamp light source 6 is intercepted by the intercepting unit 7, light L emitted from the lighting system 5 becomes annular.

It is preferable that light reflected from the intercepting unit 7 goes toward the elliptic mirror 8 and thus is used as effective light so that the intercepting unit 7 does not cause loss of light. For this, it is preferable that the intercepting unit 7 is convex, the surface thereof curving toward the lamp light source 6. The elliptic mirror 8 generally has a first focal point $F_1$ and a second focal point $F_2$. The lamp light source 6 is disposed at the first focal point $F_1$, and light reflected from the elliptic mirror 8 is focused at the second focal point $F_2$.

In FIG. 5B, the lighting system 5 has the parabolic mirror 9. The intercepting unit 7 is installed in a predetermined position inside the parabolic mirror 9. As described previously, the intercepting unit 7 reflects a portion of light emitted from the lamp light source 6 toward the parabolic mirror 9 and allows the light to go toward the periphery of the lighting system 5, so that light is not emitted from the center of the lighting system 5. In other words, the intercepting unit 7 induces light going toward the periphery of an optical axis C so as to intercept light emitted from the center of the lighting system 5 and use the intercepted light as effective light, so that loss of light can be prevented. Light reflected from the parabolic mirror 9 is annularly distributed.

Unlike light reflected from the elliptic mirror 8, light reflected from the parabolic mirror 9 advances as parallel light. Thus, in a case where the parabolic mirror 9 is used, it is preferable that a focusing lens (not shown) focusing light onto the color filter 10 is further included.

The uniform light forming units 15, which form light emitted from the lighting system 5 into uniform light, are further installed in the optical path between the lighting system 5 and the first reflecting mirror 20. The uniform light forming units 15, for example, may be integrating rods or an array of fly eye lenses. Shielding plates 14 may be placed in the center of the uniform light forming units 15, so that light emitted from the lighting system 5 is not directly incident on the display device 23.

Figure 6:
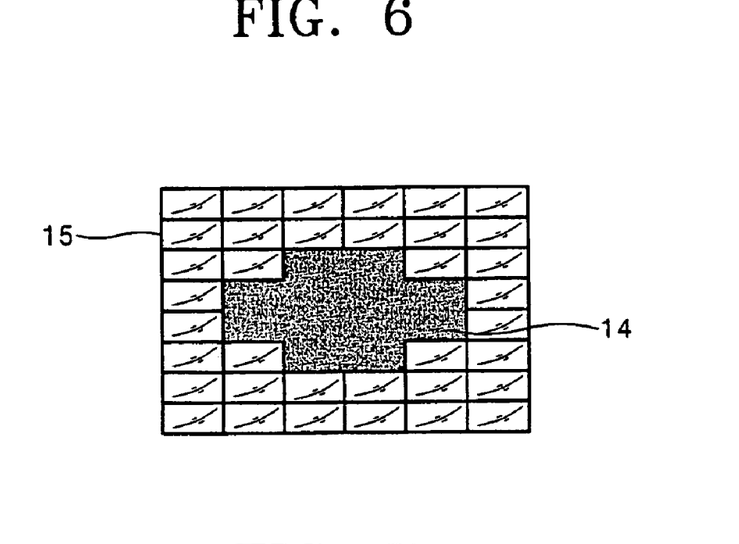
FIG. 6 is a view of a uniform light forming unit used in a projection system according to the present invention.

The shielding plates 14 may be coated so that light does not pass through the uniform light forming units 15. The lighting system 5 may include the shielding plates 14 instead of the intercepting units 7, so that light emitted from the lighting system 5 is prevented from being directly incident the display device 23. Here, it is preferable that the shielding plates 14 are formed in the centers of the uniform light forming units 15. As shown in FIG. 6, the shielding plates 14 may be cross-shaped to prevent loss of light.

More preferably, the lighting system 5 includes the intercepting unit 7, the uniform light forming units 15, and the shielding plates 14. As a result, light travelling through the intercepting unit 7 along the optical axis can be intercepted and loss of light can be prevented. Also, a portion of light that the intercepting unit 7 fails to completely intercept is shielded by the shielding plates 14. Thus, the possibility that a portion of light reflected from the elliptic mirror 8 or the parabolic mirror 9 would travel along the optical axis c and be incident on the display device 23 can be excluded.

The intercepting unit 7 or the shielding plates 14 prevent light emitted from the lighting system 5 from being incident on the display device 23, so that light that is made uniform via the first and second reflecting mirrors 20 and 25 is incident on the display device 23. In other words, light emitted from the lighting system 5 is made uniform by the uniform light forming units 15, made further uniform by the first and second reflecting mirrors 20 and 25, and then made incident on the display device 23.

The operation of the small-sized projection system having the above-described structure will be described below.

Light emitted from the lighting system 5 is split into R, G, and B color beams, according to a wavelength, by the color filter 10, and the R, G, and B color beams sequentially move toward the collimating lenses 13. Here, light having the annular intensity is formed due to the intercepting unit 7. Light that the collimating lenses 13 form into parallel light has a uniform intensity due to the uniform light forming units 15. If the uniform light forming units 15 are an array of fly eye lenses, each lens cell of the array of fly eye lenses corresponds to each pixel of the display device 23.

Figure 7:
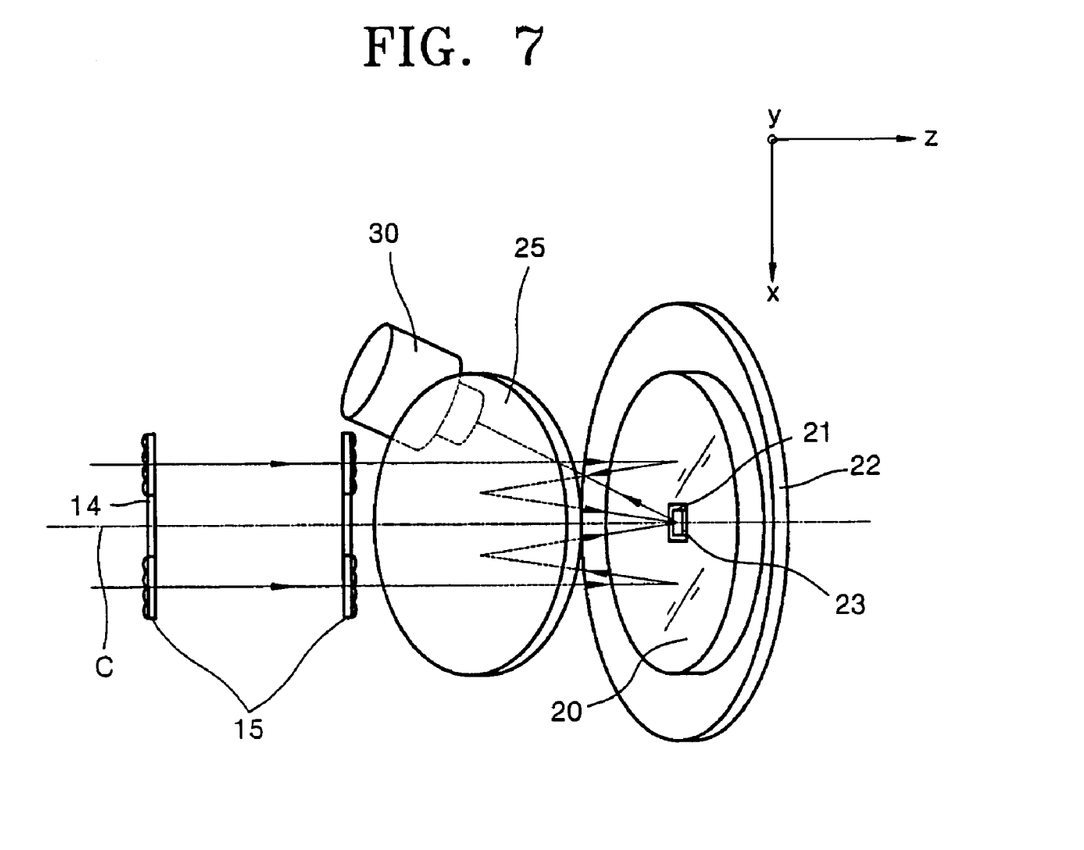
FIG. 7 is a X-Z plane view of a projection system according to the present invention.

FIG. 7 is a X-Z plane view of the projection system shown in FIG. 3. Light passing through the uniform light forming units 15 is incident on the first reflecting mirror 20, and then reflected toward the second reflecting mirror 25. Here, since the intercepting unit 7 of the lighting system 5 and the shielding plates 14 of the uniform light forming units 15 intercept light from going to the center of the optical axis C, light is not incident on the display device 23.

It is preferable that the first reflecting mirror 20 and the second reflecting mirror 25 are symmetrical on the basis of the optical axis C. In other words, it is preferable that the lighting system 5, the color filter 10, the collimating lenses 13, the uniform light forming units 15, and the first reflecting mirror 20 are arranged in line, and the second reflecting mirror 25 is disposed in an upper space between the uniform light forming units 15 and the first reflecting mirror 20 so that they are not inclined to one side of the optical axis C. It is preferable that the first and second reflecting mirrors 20 and 25 are symmetrical on the y-z plane in FIG. 7. Then, a space for installing the first and second reflecting mirrors 20 and 25 can be minimized and the projection system can be made small and lightweight.

Light reflected from the second reflecting mirror 25 proceeds to the display device 23. The display device 23 is turned on and off in each pixel according to an image signal input from the drive 22 to form a color image. The color image is enlarged and projected onto a screen (not shown) via a projection lens unit 30. The projection lens unit 30 is installed close to the second reflecting mirror 25, so that light is incident on each pixel when the display device 23 is turned on.

As described above, in an optical path in a projection system according to the present invention, a path of light reflected from the first reflecting mirror 20 to the second reflecting mirror 25, and a path of light reflected from the second reflecting mirror 25 to the display device 23, are included between the first and second reflecting mirrors 20 and 25. Thus, the space occupied by the optical components is reduced.

Also, in the projection system according to the present invention, the arrangement structure of reflecting mirrors is improved to reduce the whole size of the system. In detail, an installation space is much more reduced by installing a display device in the surface of a reflecting mirror than when the reflecting mirror and the display device are installed in different positions. Furthermore, an optical path from a first reflecting mirror to a second reflecting mirror to the display device, and an optical path from the display device to a projection lens unit, is simplified to easily perform an optical design.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A projection system comprising:
    a lighting system;
    a screen;
    a color filter separating light emitted from the lighting system according to wavelengths of the light;
    a first reflecting mirror reflecting the light passing through the color filter to change a path of the light;
    a display device provided in a predetermined position in the first reflecting mirror;
    a second reflecting mirror reflecting light reflected from the first reflecting mirror toward the display device; and
    a projection lens unit enlarging and projecting a color image formed by the display device onto the screen.

2. The projection system of claim 1, wherein the lighting system comprises:
    a lamp light source radiating the light;
    a reflector reflecting the light emitted from the lamp light source to emit the light in one direction; and an intercepting unit reflecting a portion of the light emitted from the lamp light source toward the reflector so that the light emitted from the reflector has an annular light distribution.

3. The projection system of claim 2, wherein the reflector is an elliptic mirror or a parabolic mirror.

4. The projection system of claim 3, wherein the intercepting unit is convex, the surface thereof curving toward the lamp light source.

5. The projection system of claim 2, wherein the intercepting unit is convex, the surface thereof curving toward the lamp light source.

6. The projection system of claim 2, further comprising uniform light forming units provided in an optical path between the lighting system and the first reflecting mirror, wherein the uniform light forming units convert the light passing through the color filter into uniform light.

7. The projection system of claim 6, further comprising shielding plates provided in the centers of the uniform light forming units, shielding incident light from proceeding.

8. The projection system of claim 6, wherein the uniform light forming units are integrating rods or an array of fly eye lenses.

9. The projection system of claim 6, wherein the lighting system, the color filter, the uniform light forming units, and the first reflecting mirror are arranged in line, and the second reflecting mirror is disposed in an upper space between the uniform light forming units and the first reflecting mirror so that the uniform light forming units and the first reflecting mirror are not inclined to one side of an optical axis.

10. The projection system of claim 2, wherein the first reflecting mirror and the second reflecting mirror are symmetrical with respect to an optical axis.

11. The projection system of claim 1, further comprising collimating lenses provided in an optical path between the color filter and the first reflecting mirror, wherein the collimating lenses convert incident light into parallel light.

12. The projection system of claim 1, further comprising uniform light forming units provided in an optical path between the lighting system and the first reflecting mirror, wherein the uniform light forming units convert the light passing through the color filter into uniform light.

13. The projection system of claim 12, further comprising shielding plates provided in the centers of the uniform light forming units, shielding incident light from proceeding.

14. The projection system of claim 12, wherein the first reflecting mirror is inclined at a predetermined angle with an optical axis of the uniform light formed by the light forming units.

15. The projection system of claim 1, wherein each of the first and second reflecting mirrors is one of an elliptic mirror, a plane mirror, an aspherical mirror, and a spherical mirror.

16. The projection system of claim 1, wherein the first reflecting mirror and second reflecting mirror are symmetrical with respect to an optical axis.

17. A lighting system comprising:
a lamp light source radiating light;
a reflector reflecting the light emitted from the lamp light source to emit the light in one direction; and
an intercepting unit reflecting a portion of the light emitted from the lamp light source toward the reflector so that the light emitted from the reflector has an annular light distributions
wherein the intercepting unit is convex, the surface thereof curving toward the lamp light source.

18. The lighting system of claim 17, wherein the reflector is an elliptic mirror or a parabolic mirror.

19. A projection system comprising:
a first reflecting mirror;
a second reflecting mirror; and
a display device provided in the surface of the first reflecting mirror;
wherein the second reflecting mirror receives light reflected from the first reflecting mirror and reflects the received light toward the display device.

* * * * *

UNITED STATES PATENT AND TRADEMARK OFFICE
CERTIFICATE OF CORRECTION

PATENT NO. : 7,097,309 B2 Page 1 of 1
APPLICATION NO. : 10/700054
DATED : August 29, 2006
INVENTOR(S) : Young-Chol Lee et al.

It is certified that error appears in the above-identified patent and that said Letters Patent is hereby corrected as shown below:

Column 8, Line 17, change "Alighting" to --A lighting--.

Column 8, Line 24, change "distributions" to --distribution,--.

Signed and Sealed this

Thirtieth Day of January, 2007

JON W. DUDAS
*Director of the United States Patent and Trademark Office*